US011010043B2

(12) United States Patent
Busby

(10) Patent No.: US 11,010,043 B2
(45) Date of Patent: May 18, 2021

(54) INFORMATION HANDLING SYSTEM TOTEM WITH FRICTIONAL TETHERING

(71) Applicant: Dell Products L.P., Round Rock, TX (US)

(72) Inventor: Barry Bryce Busby, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 278 days.

(21) Appl. No.: 15/815,961

(22) Filed: Nov. 17, 2017

(65) Prior Publication Data

US 2019/0155477 A1 May 23, 2019

(51) Int. Cl.
*G06F 3/0488* (2013.01)
*G06F 3/0354* (2013.01)
*G06F 3/02* (2006.01)
*G06F 9/451* (2018.01)
*G06F 3/039* (2013.01)

(52) U.S. Cl.
CPC .......... *G06F 3/0488* (2013.01); *G06F 3/0227* (2013.01); *G06F 3/0393* (2019.05); *G06F 3/03543* (2013.01); *G06F 9/451* (2018.02)

(58) Field of Classification Search
CPC ........ G06F 3/0488; G06F 3/0227; G06F 9/44; G06F 3/0354; G06F 3/0393; G06F 3/039; G06F 3/0312; G06F 3/0362; G06F 3/03543; G06F 9/451
See application file for complete search history.

(56) References Cited

U.S. PATENT DOCUMENTS

| | | | | |
|---|---|---|---|---|
| 10,705,629 | B1* | 7/2020 | Arnold | G06F 3/044 |
| 2011/0157056 | A1* | 6/2011 | Karpfinger | G06F 3/0202 |
| | | | | 345/173 |
| 2014/0043242 | A1* | 2/2014 | Dietz | G06F 3/016 |
| | | | | 345/173 |
| 2015/0220178 | A1* | 8/2015 | Zeliff | G06F 3/0362 |
| | | | | 345/178 |
| 2016/0282970 | A1* | 9/2016 | Evreinov | G06F 3/016 |
| 2017/0225804 | A1* | 8/2017 | Hafenrichter | G01N 29/04 |
| 2018/0074639 | A1* | 3/2018 | Powell | G06F 3/039 |
| 2019/0012003 | A1* | 1/2019 | Grant | G06F 3/0362 |

* cited by examiner

*Primary Examiner* — Daniel Samwel
(74) *Attorney, Agent, or Firm* — Zagorin Cave LLP; Robert W. Holland

(57) ABSTRACT

An information handling system totem input device maintains position on an articulating touchscreen display by selectively engaging friction members at the totem bottom surface with the touchscreen display surface. A capacitive sensor integrated in the totem senses end user touch and/or proximity to extend the friction members when an end user releases the totem. In one embodiment, the amount of extension and associated frictional resistance provided by the friction members adjusts based upon lateral acceleration sensed by accelerometers in the totem or in the display.

18 Claims, 3 Drawing Sheets

INFORMATION HANDLING SYSTEM TOTEM WITH FRICTIONAL TETHERING

BACKGROUND OF THE INVENTION

Field of the Invention

The present invention relates in general to the field of information handling system input devices, and more particularly to information handling system totem with frictional tethering.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with end users through touchscreen displays. For example, smartphones and tablets integrate a display in one face of a planar housing that has a touchscreen for use as the primary input device. End users make inputs at touches to displayed user interfaces, such as by performing typed inputs through a display keyboard interface. When in a desktop location, peripheral devices may interact with the information handling system to offer additional input options, such as a peripheral keyboard or mouse interfacing through wired or wireless communications. Generally, tablet information handling systems have offered end users the advantage of portability with the system having a convenient large display face for consuming information.

More recently, all-in-one information handling systems have provided larger display touchscreen sizes in a tablet form factor. The larger touchscreen surface provides a greater working area in which an end user can perform touch inputs, such as drawing with a stylus. In essence, the end user's desktop becomes a user interface that accepts touch inputs and translates the touch inputs to digital information, such as CAD drawings. The desktop touchscreen input area can also operate with peripheral devices, such as a vertical display that presents application and operating system information to allow an end user to employ the desktop touchscreen display area for making inputs. By having the touchscreen display disposed horizontally on a desktop surface, an end user have a drawing surface area on which to rest his arm and hand while performing inputs. Further improved ergonomics are provided by tilting the desktop touchscreen display to provide an angled inputs surface, such as with a stand that lifts the display side opposite the end user. In some instances, an artist easel may hold the touchscreen display to provide the end user with a variety of tilt angles for making inputs. By interacting with the display touchscreen through a precise pen-stylus, the end user may create hand drawn inputs saved to digital formats for convenient art and design work.

In addition to offering a convenient input surface, a touchscreen display offers an interface that interacts with a variety of different low-cost tools. One example is the precision pen-stylus mentioned above that writes inputs detected at the capacitive surface of the touchscreen display. Another example of a low-cost tool that leverages the horizontal touch surface is a totem that an end user interacts with to make inputs as touches to the display. For example, a totem has an upper surface that an end user grasps to accept large or small body movements, such as arm motion of the totem across the display, rotation of the totem in one location at the display and tilting of the totem in one location at the display. The touchscreen display tracks totem inputs by comparing the shape of touches on the screen against known totem footprints. More precise totem tracking is provided through capacitive touchpoints disposed on the totem bottom surface so that the totem location and orientation are available by comparison to known, precise totem touchpoints. Totems adapt to a wide variety of tasks by using varying shapes and sizes that end users inherently understand. One difficulty that can arise with totems is that an end user who tilts a horizontally-disposed display can induce movement of the totem across the display, such as when gravity causes the totem to slide from a high to a low location. Unintended movements disrupt the workspace, potentially performing unintended inputs and displacing paused interactions where an end user leaves a tilted display for a temporary distraction intending to pick up an ongoing task where it was left off.

SUMMARY OF THE INVENTION

Therefore, a need has arisen for a system and method which manages placement of devices on a touchscreen between end user interactions.

In accordance with the present invention, a system and method are provided which substantially reduce the disadvantages and problems associated with previous methods and systems for managing devices placed on a touchscreen between end user interactions. Friction members selectively extend and retract from a totem input device based upon conditions sensed at the totem and/or touchscreen display, such as measurement of touch capacitance at the totem.

More specifically, an information handling system processes information with processing components that accept inputs from a totem input device disposed on a touchscreen display. A touch controller interfaced with the touch screen detects the totem footprint and discerns end user inputs made at the totem and translated through touches at the touchscreen. Articulation of the touchscreen between horizontal and elevated orientations generates a gravitational related lateral acceleration that can introduce unintended motion of the totem. Capacitive sensing at the totem detects release of the totem at the touchscreen to extend friction members from the bottom surface of the totem, increasing frictional resistance of the totem to lateral accelerations that induce unintended movements. In one embodiment, the number of friction members and degree of extension of the friction members depends upon sensed accelerations that indicate lateral forces present at the touchscreen display. In various embodiments, extension and retraction of friction members may be performed with solenoid or microfluidic devices that adapt the totem bottom surface to achieve desired touchscreen display interactions.

The present invention provides a number of important technical advantages. One example of an important technical advantage is that an interactive device placed on a touchscreen display remains in an expected position when released by an end user. For example, a totem used by an end user on a horizontally-disposed touchscreen display selectively increases friction of a bottom surface on release by the end user so that the totem remains in position unless moved by the end user. In one embodiment, capacitive sensing at the totem outer surface detects touch and release by the end user to automatically adjust friction at the totem base to work against gravity-induced movement from a tilted display surface. An extending member at the base of the totem increases friction by extending out of the base to press against the touchscreen display, such as with a solenoid or microfluid activation. In one embodiment, the amount of additional friction may vary to adapt to the amount of tilt of the touchscreen display, such as by using accelerometer sensed conditions to determine the distance that an extending member presses out towards a display or, alternatively, the number of extending members to press outward. As an end user approaches and touches the totem, retraction of the extending members transitions the totem to a user state that accepts inputs from the end user.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system totem input device disposed on a touchscreen display selectively extends and retracts friction members to manage totem movement related to articulation of the touchscreen display. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
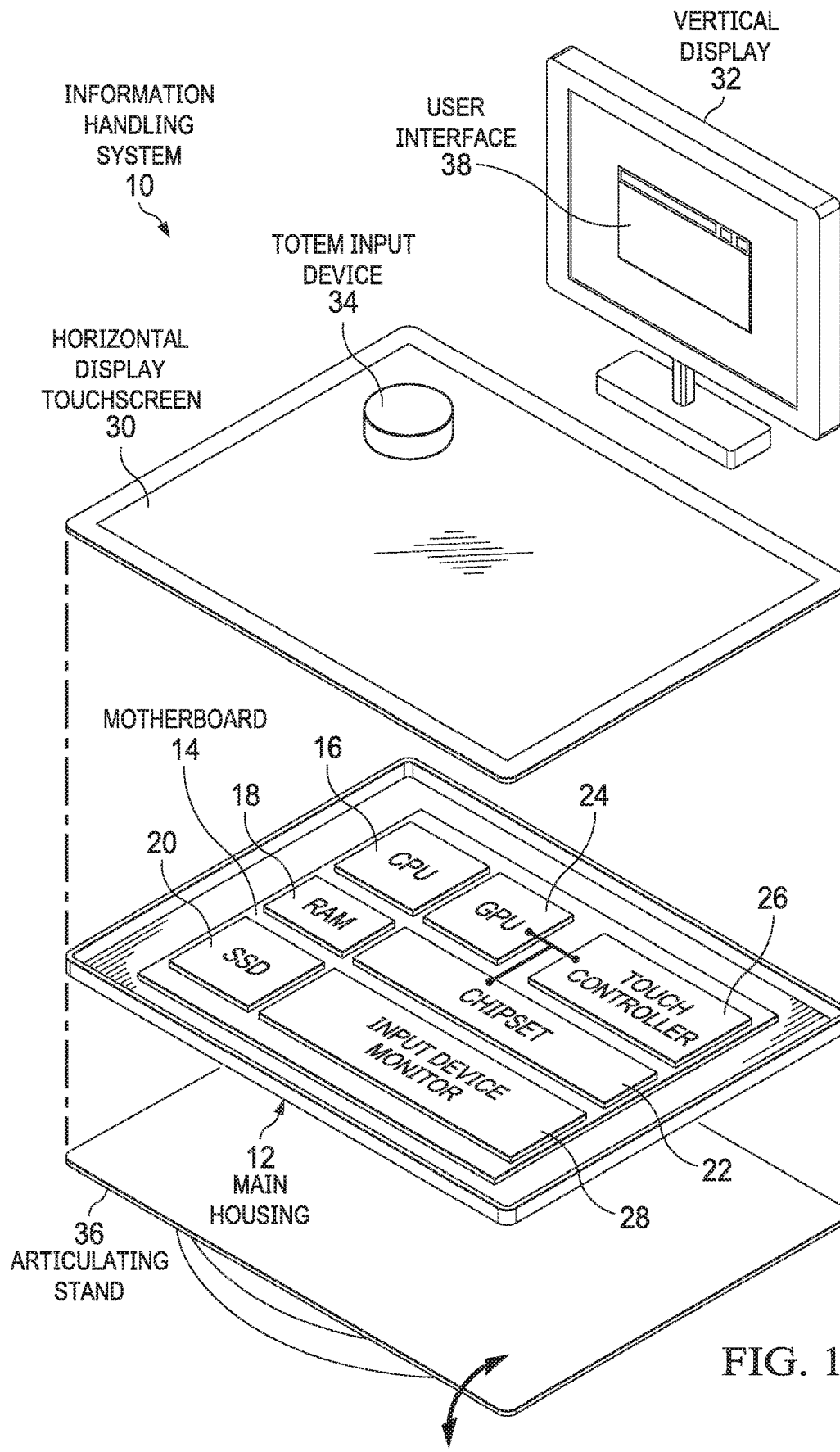
FIG. 1 depicts an expanded view of an information handling system having a horizontally disposed display configured to accept inputs from a totem device with configurable friction settings.

Referring now to FIG. 1, an expanded view depicts an information handling system 10 having a horizontally disposed display 30 configured to accept inputs from a totem device 34 with configurable friction settings. In the example embodiment, information handling system 10 has an all-in-one configuration with processing components integrated in a planar housing 12 and covered by horizontal display touchscreen 30. Information handling system 10 as a horizontal disposition and interfaces with a peripheral vertical display 32. In alternative embodiments, processing components may be disposed in a housing separate from horizontal display touchscreen 30. In the example embodiment, a motherboard 14 integrates in housing 12 to interface processing components. A central processing unit (CPU) 16 executes instructions to process information stored in random access memory (RAM) 18, such as instructions of an operating system or application retrieved from persistent memory of a solid state drive (SSD) 20. A graphics processing unit (GPU) 24 receives visual information processed by CPU 16 and translates the visual information into pixel values that define visual images presented at displays 30 and 32. A touch controller 26 receives touch information detected by a touchscreen within display 30, such as a capacitive sensor, and provides the touch information to CPU 16 as inputs. For example, a chipset 22 includes and embedded controller and embedded code that manages inputs for communication to the CPU 16 such as inputs made through keyboards and mice in addition to touchscreen inputs.

In the example embodiment, an end user performs inputs at display touchscreen 30 by touching user interfaces presented by an operating system or application executing on CPU 16. A totem input device 34 offers a physical object that an end user interacts with to perform inputs at display 30. For instance, an end user slides or rotates totem 34 to generate touches distinguishable by touch controller 26 as generated by totem 34. An application executing on CPU 16 receives and interprets touches from totem 34 to manage inputs intended by an end user. In some instances, touches and totem inputs at display 30 interact with user interfaces at other display devices 32. An articulating stand 36 disposed below display 30 raises one edge of display 30 to provide an end user with an angled input surface. The amount of tilt provided by stand 36 may vary from zero to, in some instances 90 degrees.

One difficulty with articulation of display 30 is that totem 34 can slide laterally clue to gravitational accelerations generated by tilting of display 30, resulting in inadvertent inputs as totem 34 moves across display 30 and, in some instances, totem 34 falling off of display 30. In order to manage totem 34 when left at rest, end user touch and/or proximity to totem 34 is monitored so that friction members integrated in totem 34 can interact with display 30 to restrict motion of totem 34. For example, when an end user is not touching totem 34, extending friction members out of a bottom surface of totem 34 reduces freedom of movement of totem 34 across display 30 so that unintended inputs are less likely to occur. End user touch at totem 34 may be detected with capacitive sensing integrated in totem 34, as set forth below, and/or with other cues available to information handling system 10, such as touches by an end user hand or arm on display 30, images captured by a camera, or related indications. Additional friction introduced at totem 34 by extension of friction members may be adapted to the amount of tilt created by articulating stand 36. For example, the number of friction members and the amount of friction member extension may increase as display 30 tilt angle increases so that additional frictional resistance is provided to counteract increase lateral accelerations. In one embodiment, accelerometers integrated in information handling system 10, such as in chipset 22, monitor tilt-related lateral accelerations and communicate with totem 34, such as through Bluetooth, so that appropriate levels of frictional resistance are created at totem 34. For example, an input device monitor 28 executing as embedded code on a processor within chipset 22 monitors conditions at information handling system 10 and communicates wirelessly with totem 34 to adjust friction generated by totem 34 bottom surface to adapt to detected conditions. In the event that tilt angle of display 30 generates lateral gravitational accelerations, in excess of expected frictional resistance related to extension of friction member extension, a user interface 38 presents a warning to the end user that totem 34 may fall. Further, when lateral accelerations are present and an end user touch at totem 34 is not present, inputs detected at display 30 related to movement of totem 34 are disregarded at information handling system 10, such as by discarding touches detected at display 30 that are associated with a footprint of totem 34.

Figure 2:
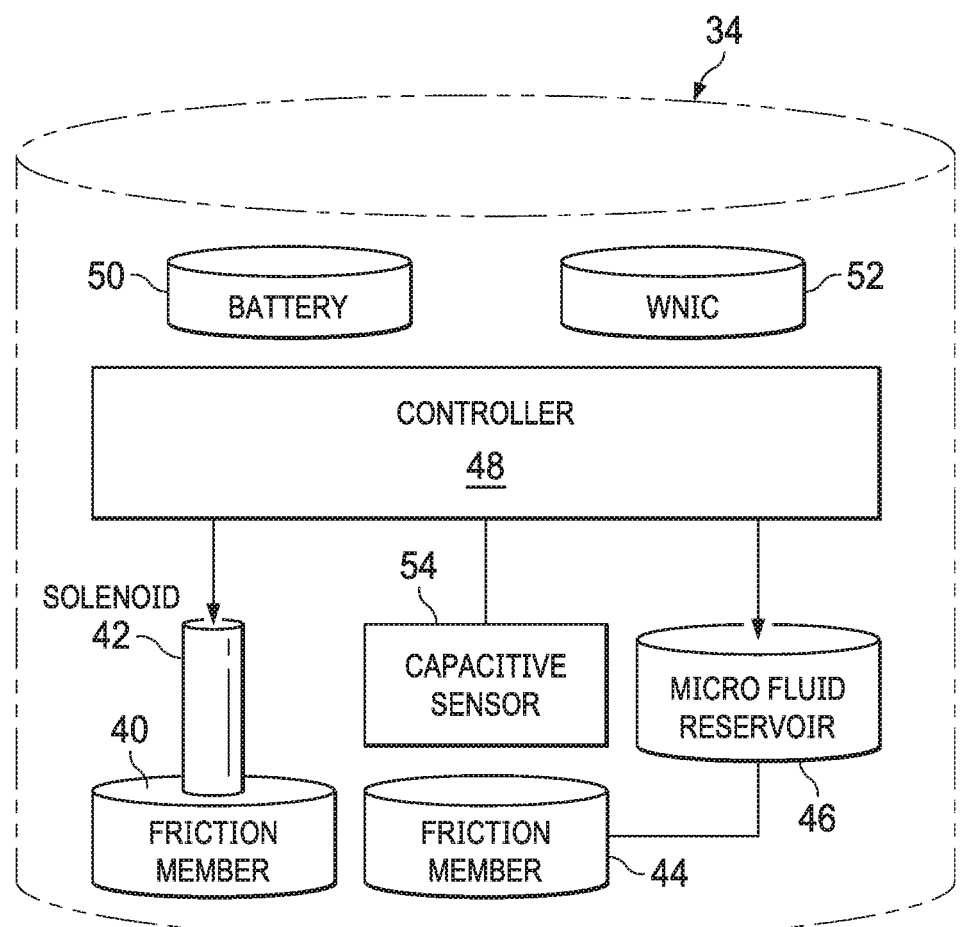
FIG. 2 depicts a block diagram of a totem device having configurable friction settings that adjust based upon capacitive sensing of an end user touch.

Referring now to FIG. 2, a block diagram depicts a totem device 34 having configurable friction settings that adjust based upon capacitive sensing of an end user touch. In the example embodiment, totem 34 integrates a friction member 40 extended out of a bottom surface with a solenoid 42. In addition, a friction member 44 extends out across a bottom surface of totem 34 with pressurization of a microfluidic reservoir 46 that inflates a circular bladder 44 or other type of shape. Friction members 40 and 44 have an increased coefficient of friction relative to other materials of the bottom surface of totem 34 so that extension of the friction member increases resistance of totem 34 to movement. Solenoid 34 may extend friction member 40 by variable amounts so that increase extension results in increased frictional resistance, or may have binary on and off positions. Similarly, variations in pressure at microfluidic reservoir 46 may result in varied amounts of friction. In various alternative embodiments different numbers and types of friction members may be integrated into totem 34 so that, for instance, different amounts of frictional resistance may be generated by extending different numbers of frictional members. In this way, frictional resistance adapts to the amount of lateral accelerations so that at initial touch by an end user, totem 34 will move in an expected manner while friction members are retracted. For instance, a totem 34 on a highly tilted surface will remain in place when not touched with substantial friction member extension, however, totem 34 will move across display 34 without an end user applying excessive force so that a transition is provided while totem 34 retracts friction members.

In the example embodiment, totem 34 integrates a controller 48 operating on a battery 50 that manages extension and retraction of friction members 40 and or 44 based upon sensed conditions of a capacitive sensor 54 or other sensors, such as accelerometers. A wireless network interface card (WNIC) 52 interfaces with controller 48 so that information handling system 10 can directly control friction member extension and retraction through wireless communication. Embedded code on controller 48 interfaces with capacitive sensor 54 to determine detection of a touch at totem 34 or proximity of a touch with capacitance at totem 34. When a touch is detected, friction members 40 and 44 are retracted such as be activation of solenoid 42 or de-pressurization of microfluidic reservoir 46 so that frictional resistance of totem 34 relative to display 30 is decreased during end user inputs. In one embodiment, proximity sensing by capacitive sensor 54 provides an indication of an expected touch to release friction before an end user grasps totem 34. For instance, detection of a touch proximity at totem 34 on the downhill side might release totem 34 so that it drops into the end user grasp while proximity on the uphill side of totem 34 may be disregarded until a full touch is detected. The relative lateral gravitational-related force may be discerned from accelerometer sensing within totem 34 that detects the tilt of display 30 or may be communicated from information handling system 10. In one embodiment, plural friction members disposed at totem 34 bottom surface may extend variable amounts with a greater amount of extension and associated friction on an uphill side of totem 34 so that any lateral movement will tend to maintain the orientation of totem 34 with the greatest frictional resistance aligned to the highest elevation of display 30.

Figure 3:
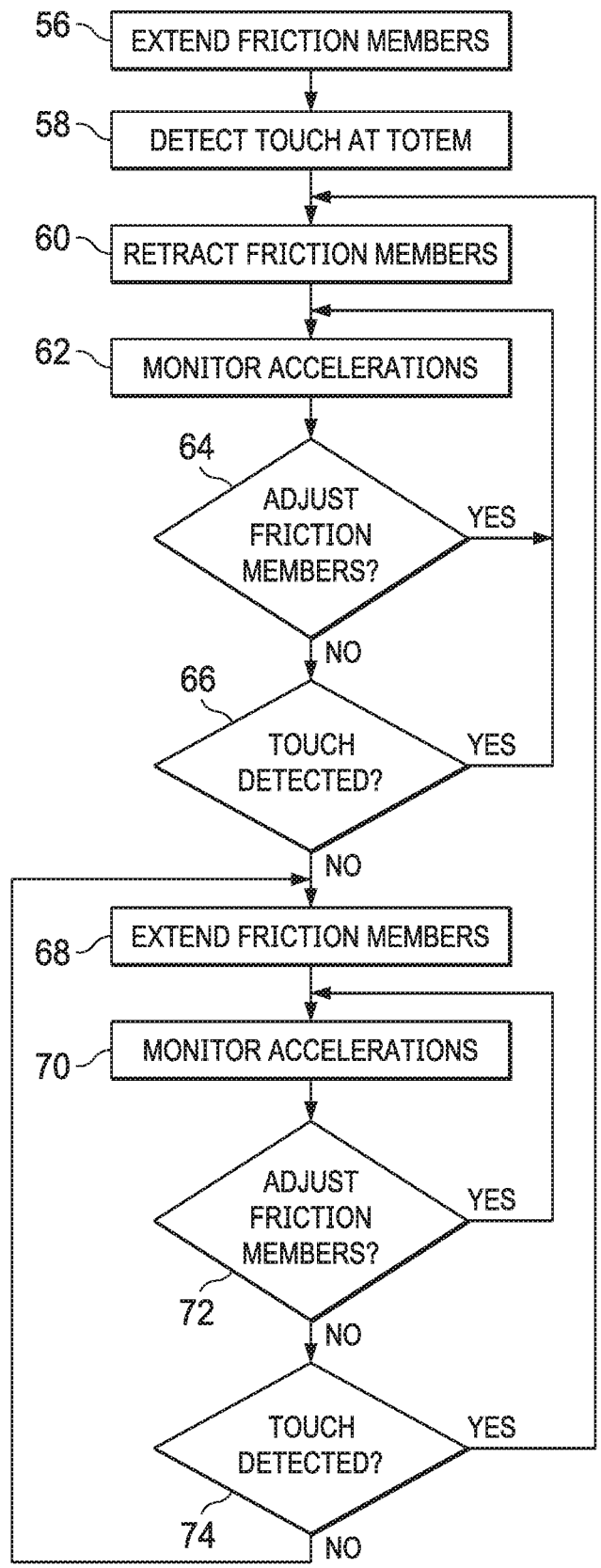
FIG. 3 depicts a flow diagram of a process for managing totem interactions at a horizontally-disposed display.

Referring now to FIG. 3, a flow diagram depicts a process for managing totem interactions at a horizontally-disposed display. The process starts at step 56 with friction members of the totem extended to provide resistance to movement of the totem. At step 58, a touch or proximity to touch is detected at the totem. In response, at step 60, friction members of the totem are retracted into the totem to provide movement of the totem. At step 62, accelerations are detected and monitored at the totem. Accelerations may indicate end user inputs and also the relative lateral alignment of the totem and display on which the totem rests. For example, during movement accelerations match changes in touch detection at display 30. When in a resting position, accelerations provide the relative axis to gravitational force so that the tilt angle of the display may be determined. At step 64, during touches by an end user friction members may be adjusted to manage totem feel to the end user as the end user moves the totem across the display. For example, if an end user has a light touch on the totem resting on a highly-tilted display, increased frictional engagement provides resistance to unintended inputs for an improved end user experience.

At step 66 a determination is made of whether a touch is detected. If yes, the process returns to step 62 to continue monitoring accelerations and adjusting frictional engagement to optimize the end user experience. If a touch is no longer detected, the process continues to the step 68 to extend the friction members so that the totem engages the display with sufficient frictional resistance to prevent unintended movements induced by lateral accelerations related to display tilt. At step 70, accelerations are monitored at the totem to detect movements that indicate insufficient frictional resistance. If movement is detected, at step 72 friction member adjustment is performed to increase frictional resistance. In one embodiment, if no motion is detected and sensed accelerations indicate that less frictional engagement will hold totem 34 in place, friction member extension may be decrease. At step 74 a determination is made of whether a touch or touch proximity is detected. If not, the process returns to step 68 to extend the friction members. If touch is detected, the process continues to step 60 to retract the friction members.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to execute instructions that process information;
   a touchscreen display interfaced with the processor, the touchscreen display operable to detect touches and report the touches to the processor;
   an input device disposed on the touchscreen display and having a predetermined footprint detected as a touch by the touchscreen display and reported to the processor;
   a capacitive sensor integrated in the input device and operable to detect touches at the input device; and
   a friction member disposed at a bottom surface of the input device and interfaced with the capacitive sensor, the friction member retracting into the input device in response to touch detected by the capacitive sensor and extending out of the input device in response to predetermined conditions detected at the input device;
   wherein
   the capacitive sensor further comprises a proximity sensor that detects end user proximity before an end user touch; and
   the friction member retracts at a predetermined proximity.

2. The information handling system of claim 1 further comprising:
   a solenoid coupled to the input device and the friction member;
   wherein the solenoid activates to extend and retract the friction member.

3. The information handling system of claim 1 further comprising:
   a microfluidic reservoir integrated in the input device and interfaced with the friction member;
   wherein the microfluidic reservoir pressurizes to extend and depressurizes to retract the friction member.

4. The information handling system of claim 1 further comprising:
   one or more accelerometers integrated in the input device and interfaced with the friction member;
   wherein the predetermined conditions comprise accelerations sensed by the one or more accelerometers.

5. The information handling system of claim 4 wherein the friction member extends by variable amounts to create variable amounts of friction working against the touchscreen display, the amount of the extending based at least in part on accelerations detected by the one or more accelerometers.

6. The information handling system of claim 4 further comprising:
   an input device monitor executing on the processor and interfaced with the one or more accelerometers; and
   an input device user interface presented at the touchscreen display by the input device monitor that warns of input device separation from the touchscreen display if sensed accelerations exceed a predetermined condition.

7. The information handling system of claim 6 further comprising plural friction members that extend from the input device, the number of friction members extending from the input device based at least upon accelerations sensed at the input device.

8. The information handling system of claim 1 wherein:
   the input device communicates to the processor upon detection of the predetermined conditions; and
   in response to the predetermined conditions, the processor discards inputs associated with the input device.

9. A method for managing totems disposed on an information handling system touchscreen display, the method comprising:
   extending, in response to predetermined conditions, a friction member from a bottom surface of the totem against the touchscreen display, the friction member engaging against the display to resist movement of the totem across the touchscreen display;
   detecting, with a capacitive sensor, an end user proximity to the totem before an end user touch; and
   in response to detecting the proximity before the end user touch, retracting the friction member into the totem.

10. The method of claim 9 further comprising:
    sensing accelerations at the totem; and
    applying the sensed accelerations to adjust friction member engagement against the touchscreen display to adapt to display tilt.

11. The method of claim 10 further comprising:
    detecting end user proximity to the totem with a proximity capacitance sensor; and
    starting the retracting of the friction member before the end user touch.

12. The method of claim 9 further comprising:
    detecting removal of an end user touch from the totem; and
    in response to the removal, extending the friction member to engage against the touchscreen display.

13. The method of claim 12 further comprising discarding inputs detected at the touchscreen display after removal of the end user touch as unintended movements associated with the totem.

14. The method of claim 13 further comprising:
    extending the friction member with a solenoid; and
    selectively extending plural friction members based upon accelerations detected at the totem.

15. The method of claim 9 wherein detecting further comprises:
    extending the friction member with pressure applied from a microfluidic reservoir; and
    adapting the surface area of the friction member by varying the pressure based upon accelerations detected at the totem.

16. The method of claim 9 further comprising:
    detecting a display angle that exceeds a predetermined threshold; and
    in response to detecting, issuing at warning at the touchscreen display regarding unintended movement of the totem.

17. An information handling system totem input device comprising:
    a body having a bottom surface that interacts with a touchscreen display to make touch inputs at the touchscreen display;
    one or more friction members disposed at the bottom surface and configured to selectively extend and retract, the one or more friction members when extended increasing frictional resistance to movement of the body against the touchscreen display; and
    a capacitive sensor integrated in the body and configured to measure capacitance at the body associated with end user touch, the capacitive sensor selectively extending and retracting the one or more friction members based at least in part on measured capacitance indicating end user proximity to the body before an end user touch.

18. The information handling system totem input device of claim 17 further comprising:
one or more accelerometers integrated in the body and interfaced with the friction members and capacitive sensor, the accelerometers configured to measure lateral accelerations at the body;
wherein the friction members extend by varied amounts based at least in part upon measured lateral accelerations.

* * * * *